United States Patent
Trombin et al.

(10) Patent No.: US 8,925,600 B2
(45) Date of Patent: Jan. 6, 2015

(54) TYRE

(75) Inventors: Andrea Trombin, Milan (IT); Stefano Montesello, Milan (IT); Gianfranco Colombo, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 0 days.

(21) Appl. No.: 14/005,042

(22) PCT Filed: Feb. 23, 2012

(86) PCT No.: PCT/IB2012/050833
§ 371 (c)(1),
(2), (4) Date: Sep. 13, 2013

(87) PCT Pub. No.: WO2012/127332
PCT Pub. Date: Sep. 27, 2012

(65) Prior Publication Data
US 2014/0000774 A1    Jan. 2, 2014

Related U.S. Application Data

(60) Provisional application No. 61/506,719, filed on Jul. 12, 2011.

(30) Foreign Application Priority Data

Mar. 21, 2011  (IT) .............. PD2011A0087

(51) Int. Cl.
*B60C 11/12*   (2006.01)
*B60C 11/11*   (2006.01)
*B60C 11/00*   (2006.01)
*B60C 11/03*   (2006.01)

(52) U.S. Cl.
CPC ............. *B60C 11/1204* (2013.04); *B60C 11/12* (2013.01); *B60C 11/1218* (2013.04); *B60C 2011/1209* (2013.04); *Y10S 152/03* (2013.01)
USPC ............ 152/209.18; 152/DIG. 3; 152/209.25

(58) Field of Classification Search
CPC ............ B60C 11/1204; B60C 11/1218; B60C 2011/1209; B60C 2011/1213
USPC ........................ 152/209.25, 209.18, DIG. 3
IPC ........................................................ B60C 11/12
See application file for complete search history.

(56) References Cited

U.S. PATENT DOCUMENTS

| 4,794,965 A | 1/1989 | Lagnier |
|---|---|---|
| 5,783,002 A | 7/1998 | Lagnier |

(Continued)

FOREIGN PATENT DOCUMENTS

| EP | 2 133 217 A1 | 12/2009 | |
|---|---|---|---|
| JP | 11123910 A | * 5/1999 | .............. B60C 11/12 |

(Continued)

OTHER PUBLICATIONS

Machine Translation: JP2006-341816; Momozu, Masatoshi; no date.*

(Continued)

*Primary Examiner* — Justin Fischer
*Assistant Examiner* — Kendra Shin
(74) *Attorney, Agent, or Firm* — Finnegan, Henderson, Farabow, Garrett & Dunner, L.L.P.

(57) ABSTRACT

Winter tyre includes a tread band on which a plurality of grooves, blocks and sipes of complex shape are provided, wherein the complex shape of the sipe is defined by a first protuberance having a vertex at a first depth from the tread surface. The vertex is connected to a sipe reference plane via a first connecting surface facing toward a radially outer side of the sipe and a second connecting surface facing toward a radially inner side of the sipe, the first connecting surface being inclined with respect to the plane of reference at an angle of between about 50° and about 90°, and the second connecting surface being inclined with respect to the plane of reference at an angle of between about 0° and about 50°.

32 Claims, 2 Drawing Sheets

(56) References Cited

U.S. PATENT DOCUMENTS

| | | | |
|---|---|---|---|
| 7,143,799 B2 * | 12/2006 | Collette et al. | 152/209.21 |
| 7,201,195 B2 * | 4/2007 | Metzger | 152/209.21 |
| 2008/0115870 A1 * | 5/2008 | Ohashi et al. | 152/209.15 |
| 2008/0135149 A1 * | 6/2008 | Sakamaki | 152/209.18 |
| 2010/0078107 A1 | 4/2010 | Bonhomme | |
| 2010/0206447 A1 * | 8/2010 | Ohashi et al. | 152/209.25 |
| 2011/0155293 A1 * | 6/2011 | Berger et al. | 152/209.24 |

FOREIGN PATENT DOCUMENTS

| | | | | |
|---|---|---|---|---|
| JP | 2000-177329 | | 6/2000 | |
| JP | 2006341816 A | * | 12/2006 | B60C 11/12 |
| KR | 2010005111 A | * | 1/2010 | B60C 11/12 |
| WO | WO 2008/068216 A1 | | 6/2008 | |
| WO | WO 2009/077807 A1 | | 6/2009 | |
| WO | WO 2010000797 A1 | * | 1/2010 | B60C 11/12 |

OTHER PUBLICATIONS

Machine Translation: JP11-123910; Shibata, K; no date.*
Machine Translation: KR2010-005111; Heo et al.; no date.*
International Search Report from the European Patent Office for International Application No. PCT/IB2012/050833, mailing date May 2, 2012.
Written Opinion of the International Searching Authority from the European Patent Office for the International Application PCT/IB2012/050833, mailing date May 2, 2012.

* cited by examiner

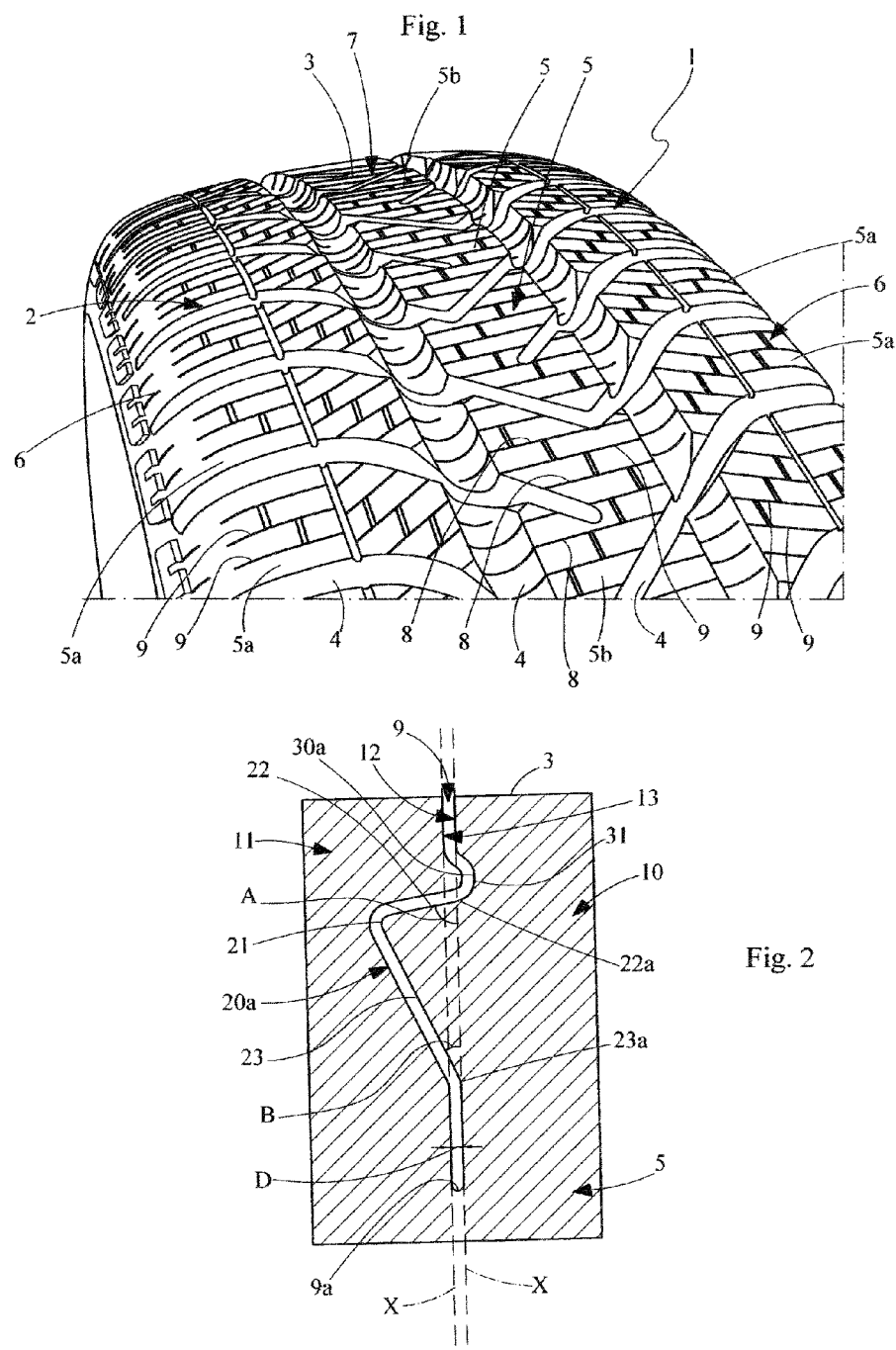

Fig. 3
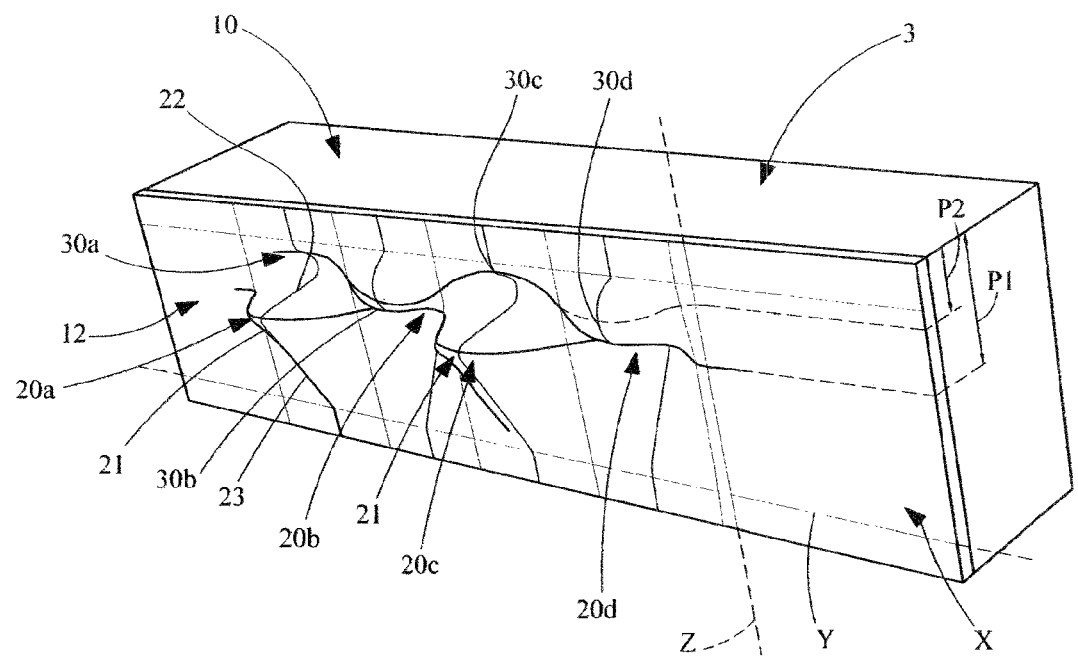
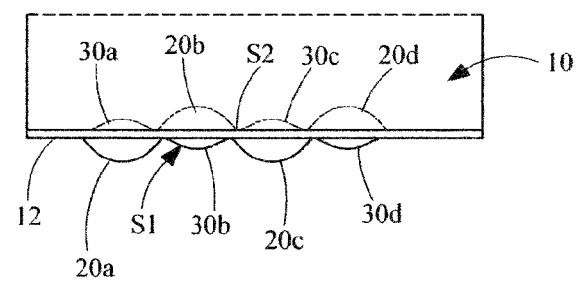
Fig. 4

TYRE

CROSS REFERENCE TO RELATED APPLICATIONS

This application is a national phase application based on PCT/IB2012/050833, filed Feb. 23, 2012, which claims the priority of Italian Patent Application No. PD2011A000087, filed Mar. 21, 2011, and the benefit of U.S. Provisional Application No. 61/506,719, filed Jul. 12, 2011, the content of each application being incorporated herein by reference.

BACKGROUND OF THE INVENTION

1. Field of the Invention

The present invention relates to a tyre, preferably a winter tyre, which is provided with a tread band whose blocks are advantageously provided with sipes which are so designed as to improve the performance levels of the tyre on dry and wet surfaces without impairing the grip characteristics on snow-covered or icy surfaces.

2. Description of the Related Art

In a typical structural configuration thereof, a winter tyre comprises a tread band on which there are defined a plurality of grooves which have a circumferential and/or transverse extent and which define a corresponding plurality of blocks, on each of which, in turn, a plurality of sipes are formed. Typically, the sipes extend inside the block in a radial plane of reference which is substantially perpendicular to the tread surface of the tyre and their presence is one of the most evident characteristics which also distinguish at first sight a winter tyre from conventional summer tyres.

The function of the sipes is to provide additional gripping edges on the snow-covered surface and to retain therein a given quantity of snow which, as known, has greater friction with respect to the snow present on the road surface than that provided by the tread band itself.

However, the presence of the sipes in the blocks of the tread band consistently reduces the performance levels of the tyre if the road surface is not covered with snow, and is dry or wet.

It is considered that this decrease in the performance levels may be attributed to the fact that the various portions of the block separated by the sipes, which may benefit from relative freedom of mutual movement, particularly in the radial direction, are not able to provide sufficient resistance to the tangential loads (or "shear stress") imparted to the tread band during acceleration phases, phases in bends or braking phases, with resultant deformation of the block and reduction of the contact surface with respect to the road surface.

In that sense, it is known that, under dry road surface conditions, the tyre configuration which has the best performance levels is the one which provides a tread band having a surface which is completely smooth so as to provide a greater contact surface with the ground and a greater rigidity when subjected to tangential loads, which are typical of phases involving acceleration, braking or travel round bends.

However, the provision of grooves in the tread band is found to be indispensable in the presence of a road surface which is wet because it allows rapid discharge of the water which may be present on the road surface, thereby preventing dangerous phenomena of aquaplaning with resultant lifting of the tyre.

A tyre which is suitable for travel under all conditions of a road surface mentioned above is therefore called for in order to balance the opposing requirements involving configuration so that the provision on the tread band of grooves and, on the blocks defined thereby, of sipes, is optimized in accordance with the required demands during use.

This need is further particularly apparent in those countries where the winters are characterized by sporadic or even occasional falls of snow. In that case, the use of winter tyres is advised with respect to summer tyres because the composition of polymer materials from which the tread band is constructed is more suitable for the harsh winter temperatures but a large part of the travel time is spent on roads which are not covered with snow but are instead simply dry or wet.

It should be specified that, in the present context, the term "sipe" is intended to refer to a recess which is formed in a portion of the tread band and which has a width of from 0.1 to 1.5 millimeters and a depth of between 1 and 15 millimeters whilst the term "groove" is intended to refer to a recess which is formed in a portion of the tread band and which has a width greater than 1.5 millimeters and a depth greater than 5 millimeters.

Furthermore, considering a sipe extending from the tread surface towards the interior of the tread band in a "plane of reference" which is incident with respect to the tread surface, the term "longitudinal direction" defines a direction of that plane substantially parallel with the tread surface and the term "transverse direction" defines a direction of that plane substantially perpendicular to the longitudinal direction. If the plane of reference extends in a direction substantially perpendicular to the tread surface, the transverse direction coincides with a radial direction of the tyre.

Furthermore, within the scope of the present description and the claims which are appended, the term "sipe of complex shape" is intended to refer to a sipe which extends in a plane of reference which is incident with respect to the tread surface and which defines, on the facing surfaces of the block portions, at least one protuberance which is formed on one of said surfaces and a corresponding recess which is formed in the other of said surfaces such that the respective projections of the two block portions which are separated by the sipe, in a transverse direction of the plane of reference, are, in the region of the protuberance and the corresponding recess, at least partially superimposed.

In that manner, a relative movement of the two block portions in a direction parallel with the plane of reference is prevented by interference between the two block portions in the region of the protuberance and recess.

Conversely, the term "sipe of simple shape" is intended to refer to a sipe whose extent in a plane of reference which is incident to the tread surface does not have any zones in which there is superimposition between the respective projections of the two block portions which are separated by the sipe in a transverse direction of the plane of reference.

Furthermore, it is intended to be understood that the distance between surfaces of respective block portions facing each other in the region of a sipe remains "substantially constant" over the extent of the sipe when the distance between said surfaces is within a range of more or less 50% of a mean value of the distance calculated over the entire extent of the sipe.

In the present description and in the subsequent claims, the inclinations of the connecting surfaces between a vertex of a protuberance or a recess and the plane of reference are further defined taking into consideration the triangle formed in a plane of section perpendicular to the plane of reference, parallel with the transverse direction and extending through the vertex of the protuberance or recess, and defined by the vertex of the protuberance or the recess and the intersection points between the curves defined by the intersection of the connecting surfaces with the plane of reference and the above-mentioned plane of section. In particular, considering the side belonging to the plane of reference to be the base of the triangle, the inclination of each connecting surface is defined with the respective angle relative to the base of the triangle that is formed in the region of the intersection points set out above, respectively.

In that manner, the inclination of the connecting surface is measured in a plane of section perpendicular to the plane of reference parallel with the transverse direction and extending through the vertex and, in the case of curved connecting surfaces, a mean inclination of the connecting surface is in fact considered.

In the present description and in the subsequent claims, it is further intended to be understood that a connecting surface is "substantially planar" when it is planar over at least 50% of the surface thereof.

In the present description and in the subsequent claims, the term "profile of a recess or a protuberance in a longitudinal or transverse direction" is further intended to refer to the orthogonal projection of the recess or the protuberance in a plane perpendicular to the plane of reference and parallel with the longitudinal or transverse direction, respectively.

Finally, a protuberance is defined as being "completely internal with respect to the block" when its connecting surfaces with respect to the plane of reference are not intersected by the external surfaces of the block. This definition applies in a generally similar manner to a recess or a succession of protuberances or recesses which are "completely internal with respect to the block".

International Patent Application No. WO 2009/077807 in the name of the same Applicant discloses a winter tyre whose blocks are affected by sipes, in which there are provided, on the surfaces of the block portions facing each other, protuberances and recesses with a curved, semi-conical profile which extends in a substantially longitudinal direction from the axial ends of the sipe towards a central region thereof. The profile of those protuberances in the radial direction is substantially semicircular with a section decreasing towards the central region of the sipe.

SUMMARY OF THE INVENTION

Firstly, the Applicant verified that the presence of sipes of complex shape on the blocks increases the rigidity thereof when subjected to shear stress, improving the performance levels of the tyre on dry and wet surfaces both during braking phases and during traction phases and when driving round bends.

In particular, the Applicant has observed that the rigidity of a block increases with an increase in the interference between the block portions and therefore with an increase in the dimensions and the number of protuberances formed on the surfaces, respectively.

At the same time, however, the Applicant verified how the production of sipes of complex shape capable of providing a high level of interference between the adjacent block portions results in an increase in production difficulties because the difficulty of removal of the tyre from the moulds is increased, with the additional possibility of undesirable breakages of the block portions in the region of the protuberances.

Therefore, the Applicant perceived that, in order to increase the capacity for mutual interconnection between adjacent block portions without complicating the production step involving the tyre being removed from the mould, it was necessary to improve the configuration of the protuberances and recesses, improving the capacity thereof for withstanding radial loads without increasing the interference surface between the block portions.

Finally, the Applicant has found that a sipe of complex shape formed so as to define on a block portion a protuberance, which is connected to the plane of reference at the radially internal side of the sipe with a surface of reduced inclination and at the radially external side of the sipe with a surface of increased inclination, gives rise to a substantially strut-like structure which is capable of withstanding, without relevant deformations, great radial loads, discharging them towards the inner side of the tread band.

In particular, in a first aspect thereof, the invention relates to a tyre comprising a tread band, on which there is provided a plurality of grooves, at least one block defined by said plurality of grooves, at least one sipe of complex shape provided on said at least one block which defines a first and a second block portion which are separated from each other by said sipe, and a first and a second surface on said first and second block portions, respectively, which face each other in the region of said sipe of complex shape and which are similarly shaped in such a manner that the distance between said first and second surfaces is maintained substantially constant, each of said first and second surface extending in a plane of reference which is incident to a tread surface which is radially external with respect to said tread band, there being defined in said plane of reference a longitudinal direction which is substantially parallel with said tread surface and a transverse direction which is substantially perpendicular to said longitudinal direction, in which there is provided, on at least one of said first and second surfaces, at least one first protuberance whose projection in said transverse direction is at least partially superimposed on the projection in said transverse direction of the other of said first and second surface and whose vertex is positioned at a first depth from said tread surface measured in said transverse direction, said vertex being connected to said plane of reference via a first connecting surface facing towards the radially external side of said sipe and a second connecting surface facing towards the radially internal side of said sipe, said first connecting surface being inclined with respect to said plane of reference at an angle of between about 50° and about 90° and said second connecting surface being inclined with respect to said plane of reference at an angle of between about 0° and about 50°.

The Applicant considers that, in this manner, the block portions which are separated by the sipe of complex shape are effectively mutually secured in the transverse direction of the plane of reference, even in the presence of a small number of protuberances having small dimensions, which allow a degree of difficulty to be maintained that is acceptable for the removal of the tyre from the mould. At the same time, however, the block portions can be moved away from each other so as to allow a suitable quantity of snow to be introduced and retained therebetween inside the sipe which separates them.

In that manner, the Applicant intends to obtain a tyre with limited deformation of the blocks when it is subjected to tangential loads, as in the case of acceleration, braking or bends on a dry or wet surface, but able to ensure optimum performance levels on a snow-covered surface.

The present invention, in terms of the above-mentioned aspect, may have at least one of the preferred features set out below, considered individually or in combination with each other.

According to a preferred embodiment, said first and second surface are configured in such a manner that the distance between said first and second surface is maintained substantially constant over the extent of said sipe.

In that manner, the two facing surfaces of the block portions defined by the sipe have a similar configuration so that a recess formed in a second surface corresponds to a protuberance provided on a first surface and, vice versa, a protuberance formed on a second surface corresponds to a recess provided in a first surface.

Preferably, said first connecting surface is inclined at an angle of between about 70° and about 90° with respect to said plane of reference.

In that manner, the protuberance provides a suitable intersection surface for the radial forces to which the block portion is subjected, limiting the component of such forces tending to move the block portions away from each other and, instead, maximizing the component of those forces that is directed towards the bottom of the sipe, that is to say, towards the inner side of the tread band.

Furthermore, maintaining a slight inclination of the connecting surface promotes the removal step of the tyre from the mould portion which defines the sipe.

Preferably, said second connecting surface is inclined at an angle of between about 15° and about 35° with respect to said plane of reference.

In that manner, the radial forces to which the block portion is subjected are effectively discharged towards the bottom of the sipe, limiting the flexural deformation of the protuberance.

In a preferred embodiment, said first connecting surface is substantially plane and parallel with said longitudinal direction.

It is further similarly preferable for said second connecting surface to be substantially plane and parallel with said longitudinal direction.

This feature promotes better interconnection between the block portions.

According to a preferred embodiment, there is provided on said at least one of said first and second surface at least one first recess, which is aligned with said first protuberance in said transverse direction and which is positioned at a second depth from said tread surface, measured in said transverse direction smaller than said first depth.

The surface of the block portion is thereby increased so as to withstand radial forces without increasing the distance of the vertex of said first protuberance from the plane of reference, which allows the step of removing the tyre from the mould to be substantially unimpaired.

Furthermore, said first recess is preferably connected to said first connecting surface.

In a greatly preferred manner, the profile of said first recess in said transverse direction defines an arc of a circle connecting a vertex of said first recess to said plane of reference.

It is further preferable for said first recess to be connected to said plane of reference, on a transversely opposite side from said first protuberance, at a depth of between about 1 mm and about 3 mm.

In that manner, the recess does not project at the tread surface when the tyre is new, but the longitudinal profile thereof becomes visible at the tread surface after a predetermined degree of wear. Therefore, considering that the longitudinal profile of the first recess cannot be rectilinear, after said predetermined degree of wear there is consequently obtained an increase in the longitudinal development of the sipe, with resultant greater capacity for retention of the snow and greater extension of the edge presented by the block portion on the road surface. That advantageous feature allows a counter-balance to the normal decrease in performance levels on snow-covered ground of a worn winter tyre, which is determined by the reduction over time of the resilience of the polymer composition from which the tread band is constructed.

According to a preferred embodiment, the vertex of said first protuberance is more spaced from said plane of reference than a vertex of said first recess.

In that manner, the longitudinal profile of the sipe corresponding to the vertex of the first protuberance is greater than the longitudinal profile corresponding to the first recess, and considering that the vertex of the protuberance is at a greater depth than the first recess, it is possible for the sipe to have a visible longitudinal development over the tread surface that is greater when the tyre is more greatly worn and therefore the properties of grip provided by the tread band will be less.

Preferably, a vertex of said first recess is spaced from said plane of reference by a measurement of between about 0.5 mm and about 1.5 mm.

It is further preferable for said vertex of said first protuberance to be spaced from said plane of reference by a measurement of between about 1 mm and about 2.5 mm.

Those dimensions optimize the effect of interconnection brought about between the block portions and the ease of removal of the tyre from the mould.

Preferably, said first depth from said tread surface is between about 2 mm and about 4 mm.

Preferably, said second depth from said tread surface is between about 1 mm and about 3 mm.

In a preferred embodiment, on said at least one of said first or second surface a second recess is provided alongside said first protuberance and configured as a mirror image of said first protuberance with respect to said plane of reference.

Preferably, on said at least one of said first or second surface a second protuberance is provided alongside said first recess and configured as a mirror image of said first recess with respect to said plane of reference.

In a greatly preferred manner, said second protuberance is aligned in said transverse direction with said second recess.

Preferably, said second protuberance is aligned in said longitudinal direction with said first recess so as to be positioned at said second depth from said tread surface.

Similarly, it is preferable for said first protuberance to be aligned in said longitudinal direction with said second recess so as to be positioned at said first depth from said tread surface.

Owing to the features set out above, the surfaces of the block portions facing each other have a symmetrical and modular extent so as to uniformly withstand the forces to which the block is subjected, both in a radial direction and in a longitudinal direction.

Preferably, the profile of said first recess and of said second protuberance in said longitudinal direction defines a first sine curve.

Preferably, the profile of said second recess and of said first protuberance in said longitudinal direction defines a second sine curve.

In another preferred embodiment, said first and second sine curve have the same wavelength.

Preferably, said first and second sine curve have a wavelength of between about 5 mm and about 15 mm.

In another preferred embodiment, on said at least one of said first and second surface there is provided a first modular sequence of said first protuberance alternating with said second recess for a total of at least three protuberances and recesses.

In another preferred embodiment, on said at least one of said first and second surface there is provided a second modular sequence of said first recess alternating with said second protuberance for a total of at least three protuberances and recesses.

Preferably, said first or second modular sequence comprises a total of four protuberances and recesses.

In another preferred embodiment, said first or second modular sequence are completely internal with respect to said block.

In a particularly preferred manner, said plane of reference is a radial plane of said tyre.

Preferably, on said tread band, blocks are provided comprising at least one of said sipes of complex shape and at least one sipe of simple shape extending along a plane of reference incident to said tread surface and defining on each block portion respective surfaces devoid of protuberances or recesses.

In a greatly preferred manner, in said blocks the ratio between said sipes of complex shape and said sipes of simple shape is greater than one.

In another preferred embodiment, provision is made for only sipes of complex shape to be provided on the blocks formed in a shoulder region of said tread band.

The rigidity of the blocks which are provided in the regions which are subjected to a greater extent to tangential loads in the event of acceleration, braking or driving round bends is thereby increased.

BRIEF DESCRIPTION OF THE DRAWINGS

The features and advantages of the invention will be better appreciated from the detailed description of a preferred embodiment thereof given merely by way of non-limiting example with reference to the appended drawings, in which:

FIG. 1 is a schematic perspective view of a significant portion of a tyre constructed in accordance with the present invention, FIG. 2 is a cross-section, drawn to an enlarged scale, of a block of said tyre involving a sipe of complex shape, FIG. 3 is a perspective view, drawn to an enlarged scale, of a portion of the block of FIG. 2, FIG. 4 is a plan view, drawn to an enlarged scale, of the block portion of FIG. 3.

DETAILED DESCRIPTION OF THE INVENTION

With reference to the appended Figures, there is generally designated 1a tyre, preferably of the winter type, which is constructed in accordance with the present invention.

The tyre 1 comprises a tyre structure which is conventional per se and which is not illustrated in the appended Figures, and a tread band 2 which is arranged in a radially external position with respect to the tyre 1 and on which there is defined a tread surface 3, which is identified as the radially external surface of the tread band 2, and which is provided to move into contact with a road surface, which is not illustrated in the Figures and over which the tyre is intended to roll.

A plurality of grooves, which are all generally designated 4 and which delimit a plurality of blocks 5, are formed on the tread band 2 and are arranged in succession along a circumferential development of the tread band 2. There is particularly identified a first plurality of blocks 5a which are formed on shoulder regions 6 which are defined at the axially opposite regions of the tread band 2, and a second plurality of blocks 5b which are formed in a central region 7 of said tread band 2 that is interposed between the shoulder regions 6.

Sipes 8 of simple shape and/or sipes 9 of complex shape are formed on each block 5.

In particular, in the preferred embodiment described here, each block 5a formed on a shoulder region 6 is affected by sipes 9 of complex shape whilst each block 5b formed in the central region 7 of the tread band 2 is affected both by sipes 8 of simple shape and by sipes 9 of complex shape.

Preferably, in said blocks 5b formed in the central region 7, the ratio between the number of said sipes 9 of complex shape and said sipes 8 of simple shape is greater than one.

Alternatively, it is possible to obtain other embodiments, in which the arrangement and the number of sipes of complex shape and/or simple shape are differently planned on the tread band so as to comply with specific functional requirements.

Each sipe 9 of complex shape separates a first and a second block portion which are designated 10 and 11 and which have a first and a second surface 12 and 13 which face each other in the region of the sipe 9, respectively.

Each of the first and second surfaces 12 and 13 intersects with the tread surface 3 which defines a longitudinal direction Y of the sipe 9 of complex shape and which extends inside the tread band 2 in a plane of reference X which is preferably coincident with a radial plane of the tyre 1.

In that manner, both the longitudinal direction Y, which is substantially parallel with the tread surface 3, and a transverse direction Z, which is substantially perpendicular to the longitudinal direction Y and parallel with a radial direction of the tyre 1, are unambiguously defined in the plane of reference X.

In the preferred embodiment described herein, each sipe 8, 9 extends in a single longitudinal direction Y. However, there is similarly provision for the sipes to be able to extend in accordance with a broken line, in a zigzag pattern. In that case, it will be sufficient to consider each sipe portion which is subtended at a linear segment of the broken line to be an independent sipe and to apply, for at least one of those sipe portions, the considerations set out below.

As can clearly be seen in FIG. 2, the first and the second surfaces 12 and 13 are formed in such a manner that the distance D between the first and the second surfaces 12, 13 remains substantially constant over the extent of the sipe.

The distance D between the first and the second surfaces 12, 13 is preferably approximately 0.5 mm.

The configuration of only the first surface 12 is described below in detail, assuming that the configuration of the second surface 13 can immediately be formed in light of the correspondence set out above.

A first protuberance 20a, whose vertex 21 is spaced apart from the plane of reference X by a measurement between 1 and 2.5 mm, preferably about 1.75 mm, is provided on the first surface 12.

In that manner, the orthogonal projection of the protuberance 20a in the transverse direction Z is partially superimposed on the orthogonal projection in the same transverse direction Z of the second surface 13.

The vertex 21 is positioned at a first depth P1 from the tread surface 3, of between 2 and 4 mm, and is connected to the reference plane X by means of a first connecting surface 22 facing towards the radially external side of the sipe 9 of complex shape, in particular towards the tread surface 3, and a second connecting surface 23 facing towards the radially internal side thereof, in particular towards a bottom 9a of the above-mentioned sipe 9 of complex shape.

As FIG. 2 shows more clearly, the first and the second connecting surfaces 22, 23 which are intersected by a plane of section which is perpendicular to the plane of reference X, parallel with the transverse direction Z and extending through the vertex 21, define points 22a and 23a which belong to the plane of reference X, respectively.

When the triangle formed by the vertex 21 and the points 22a and 23a defined above is considered, there are identified angles A and B of the triangle, respectively, which are opposite the vertex 21 and which represent the inclination of the first and second connecting surfaces 22 and 23 with respect to the plane of reference X, respectively.

In particular, the angle A which represents the inclination of the first connecting surface 22 with respect to the plane of reference X is between 50° and 90°, preferably between 70° and 90° and, in this preferred embodiment, is approximately 80°.

The angle B which represents the inclination of the second connecting surface 23 with respect to the plane of reference X is between 0° and 50°, preferably between 15° and 35°, and in this preferred embodiment, is approximately 25°.

Preferably, both the first and the second connecting surface 22 and 23 are substantially planar and parallel with the longitudinal direction Y, respectively.

There is further provided in the first surface 12 a first recess 30a which is aligned with the first protuberance 20a in the transverse direction Z and whose vertex 31 is spaced apart from the plane of reference X at the opposite side to the vertex 21 of the protuberance 20a by a measurement of between 0.5 and 1.5 mm, preferably approximately 0.75 mm. That distance is advantageously less than the distance of the vertex 21 but greater than the distance D between the first and second surfaces 12 and 13.

The vertex 31 of the recess 30a is positioned at a second depth P2 from the tread surface 3 between 1 and 3 mm and is connected to the protuberance 20a in the region of the first connecting surface 22.

As can be seen in FIG. 2, the connecting surface of the vertex 31 with respect to the protuberance 20a and, at the transversely opposite side, the plane of reference X has a circular-arc-like profile in the transverse direction Z.

In particular, the first recess 30a is connected to the plane of reference X at the side opposite the protuberance 20a at a depth between 1 and 3 mm.

There is further provision in the first surface 12 for a second recess 20b which is alongside the first protuberance 20a and which is configured as a mirror image thereof with respect to the plane of reference X. The second recess 20b reproduces, as a negative arrangement, the first protuberance 20a and, with the correspondence between the first surface 12 and the second surface 13 being considered, faces a protuberance which is formed on the second surface 13 which is identical to the first protuberance 20a.

The second recess 20b is further aligned with the first protuberance 20a in the longitudinal direction Y.

In the same manner, there is further provided on the first surface 12 a second protuberance 30b which is alongside the first recess 30a and which is configured as a mirror image thereof with respect to the plane of reference X. In that case, the second protuberance 30b also reproduces, as a negative arrangement, the first recess 30a and faces a recess which is formed in the second surface 13 which is identical to the first recess 30a.

The second protuberance 30b is further aligned with the first recess 30a in the longitudinal direction Y and with the second recess 20b in the transverse direction Z.

As can better be seen in FIG. 4, the profile of the first recess 30a and the second protuberance 30b in the longitudinal direction Y defines a first sine curve S1 whilst the profile of the second recess 20b and the first protuberance 20a in the longitudinal direction Y defines a second sine curve S2.

The sine curves S1 and S2 have the same wavelength of between 5 and 15 mm and preferably of about 10 mm.

The same alternating arrangement of recesses and protuberances is repeated in succession in the longitudinal direction Y so as to determine a first modular succession formed, in total, by four protuberances (20a, 20c) and recesses (20b, 20d) which are identical to the first protuberance 20a and the second recess 20b, respectively, and a second modular succession formed, in total, by four protuberances (30b, 30d) and recesses (30a, 30c) which are identical to the first recess 30a and the second protuberance 30b, respectively.

The number of alternate protuberances and recesses which form the modular successions can be varied in accordance with the longitudinal extent of the sipe 9 of complex shape, respectively, but it is preferable for recesses and protuberances to be completely internal with respect to the block 5.

In another preferred embodiment, said recesses and protuberances could also be separated by a rectilinear portion and/or project in the region of an external surface of the block 5.

EXAMPLE

The Applicant has subjected the tyre 1 to road-holding tests, in particular brake tests and tests for behaviour when driven over different road surfaces (snow-covered, wet and dry) and has compared the results thereof with a completely similar tyre in terms of dimensions, polymer composition and tread pattern, but with blocks which are provided only with sipes of simple shape.

The results obtained, as illustrated in Table 1, have shown an improvement in the performance levels on snow-covered road surfaces; furthermore, under conditions involving wet and dry road surfaces, the performance levels provided by the tyre constructed in accordance with the present invention have been found to be substantially superior.

TABLE 1

|  | Comparative tyre | Tyre of invention |
| --- | --- | --- |
| Braking on snow | 100 | 102.2 |
| Traction on snow | 100 | 100.2 |
| Slalom on snow | 100 | 100.6 |
| Behaviour during driving on snow | 100 | 107.0 |
| Braking in wet | 100 | 101.1 |
| Grip in wet | 100 | 103.7 |
| Behaviour during driving in wet | 100 | 100.7 |
| Braking in dry | 100 | 100.0 |
| Behaviour during driving in dry | 100 | 109.3 |

The invention claimed is:

1. A tyre comprising a tread band on which a plurality of grooves is provided; at least one block defined by said plurality of grooves; at least one sipe of complex shape provided on said at least one block defining a first and a second block portions separated from each other by said sipe, as well as a first and a second surfaces, respectively, on said first and second block portions, facing each other in a region of said sipe of complex shape, each of said first and second surfaces extending along a plane of reference incident to a tread surface radially external to said tread band, a longitudinal direction, substantially parallel with said tread surface, and a transverse direction substantially perpendicular to said longitudinal direction, being defined in said plane of reference, wherein on at least one of said first and second surfaces at least one first protuberance is provided, a projection of said at least one first protuberance in said transverse direction is at least partially superimposed on a projection forming a first recess in said transverse direction of the other of said first and second surfaces, and a vertex of said at least one first protuberance is positioned at a first depth from said tread surface measured in said transverse direction, said vertex being connected to said plane of reference via a first connecting surface facing toward a radially outer side of said sipe and a second connecting surface facing toward a radially inner side of said sipe, said first connecting surface being inclined with respect to said plane of reference at an angle of between about 50° and about 90° and said second connecting surface being inclined with respect to said plane of reference at an angle of between about 0° and about 50°, wherein, on said at least one of said first and second surfaces, said first recess is provided, aligned with said first protuberance in said traverse direction and positioned at a second depth from said tread surface, measured in said traverse direction, smaller than said first depth, and wherein the vertex of said first protuberance is more spaced from said plane of reference than a vertex of said first recess.

2. The tyre according to claim 1, wherein said first and second surfaces are configured in such a way that a distance between said first and second surfaces is maintained substantially constant along an extent of said sipe.

3. The tyre according to claim 1, wherein said first connecting surface is inclined at an angle of between about 70° and about 90° with respect to said plane of reference.

4. The tyre according to claim 1, wherein said second connecting surface is inclined at an angle of between about 15° and about 35° with respect to said plane of reference.

5. The tyre according to claim 1, wherein said first connecting surface is substantially plane and parallel with said longitudinal direction.

6. The tyre according to claim 1, wherein said second connecting surface is substantially plane and parallel with said longitudinal direction.

7. The tyre according to claim 1, wherein said first recess is connected to said first connecting surface.

8. The tyre according to claim 1, wherein a profile of said first recess in said traverse direction defines an arc of a circle connecting a vertex of said first recess to said plane of reference.

9. The tyre according to claim 1, wherein said first recess is connected to said plane of reference, on a transversely opposite side from said first protuberance, at a depth of between about 1 mm and about 3 mm.

10. The tyre according to claim 1, wherein a vertex of said first recess is spaced from said plane of reference by between about 0.5 mm and about 1.5 mm.

11. The tyre according to claim 1, wherein said vertex of said first protuberance is spaced from said plane of reference by between about 1 mm and about 2.5 mm.

12. The tyre according to claim 1, wherein said first depth from said tread surface is between about 2 mm and about 4 mm.

13. The tyre according to claim 1, wherein said second depth from said tread surface is between about 1 mm and about 3 mm.

14. The tyre according to claim 1, wherein, on said at least one of said first or second surfaces, a second recess is provided alongside said first protuberance and configured as a mirror image of said first protuberance with respect to said plane of reference.

15. The tyre according to claim 14, wherein on said at least one of said first or second surfaces, a second protuberance is provided alongside said first recess and configured as a mirror image of said first recess with respect to said plane of reference.

16. The tyre according to claim 15, wherein, on said at least one of said first or second surfaces, a second recess is provided alongside said first protuberance and configured as a mirror image of said first protuberance with respect to said plane of reference, and wherein said second protuberance is aligned in said transverse direction with said second recess.

17. The tyre according to claim 15, wherein said second protuberance is aligned in said longitudinal direction with said first recess so as to be positioned at said second depth from said tread surface.

18. The tyre according to claim 15, wherein a profile of said first recess and of said second protuberance in said longitudinal direction defines a first sine curve.

19. The tyre according to claim 15, wherein, on said at least one of said first and second surfaces, there is provided a second modular sequence of said first recess alternating with said second protuberance for a total of at least three protuberances and recesses.

20. The tyre according to claim 19, wherein said second modular sequence comprises a total of four protuberances and recesses.

21. The tyre according to claim 19, wherein said second modular insert is completely internal with respect to said block.

22. The tyre according to claim 14, wherein, on said at least one of said first and second surfaces there is provided a first modular sequence of said first protuberance alternating with said second recess for a total of at least three protuberances and recesses.

23. The tyre according to claim 22, wherein said first modular sequence comprise a total of four protuberances and recesses.

24. The tyre according to claim 22, wherein said first modular sequence is completely internal with respect to said block.

25. The tyre according to claim 14, wherein said first protuberance is aligned in said longitudinal direction with said second recess so as to be positioned at said first depth from said tread surface.

26. The tyre according to claim 14, wherein a profile of said second recess and of said first protuberance in said longitudinal direction defines a second sine curve.

27. The tyre according to claim 26, wherein a profile of said first recess and of said second protuberance in said longitudinal direction defines a first sine curve, and wherein said first and second sine curves have the same wavelength.

28. The tyre according to claim 27, wherein said first and second sine curves have a wavelength of between about 5 mm and about 15 mm.

29. The tyre according to claim 1, wherein said plane of reference is a radial plane of said tyre.

30. The tyre according to claim 1, comprising blocks on said tread band, said blocks comprising at least one of said sipes of complex shape and at least one sipe of simple shape extending along a plane of reference incident to said tread surface and defining on each block portion respective surfaces devoid of protuberances or recesses.

31. The tyre according to claim 30, wherein, in said blocks, the ratio between said sipes of complex shape and said sipes of simple shape is greater than one.

32. The tyre according to claim 1, comprising only sipes of complex shape on blocks formed in a shoulder region of said tread band.

* * * * *